US012286303B2

(12) United States Patent
Van Faassen

(10) Patent No.: US 12,286,303 B2
(45) Date of Patent: Apr. 29, 2025

(54) CONVEYOR BELT AND DEVICE FOR LOCKING A ROD TO A LINK OF SUCH A CONVEYOR BELT

(71) Applicant: Frans Bakker Beheer B.V., Losser (NL)

(72) Inventor: Willem Van Faassen, Hengelo (NL)

(73) Assignee: Frans Bakker Beheer B.V., Losser (NL)

( * ) Notice: Subject to any disclaimer, the term of this patent is extended or adjusted under 35 U.S.C. 154(b) by 91 days.

(21) Appl. No.: 18/190,273

(22) Filed: Mar. 27, 2023

(65) Prior Publication Data

US 2023/0303331 A1 Sep. 28, 2023

(30) Foreign Application Priority Data

Mar. 28, 2022 (EP) .................................... 22164838

(51) Int. Cl.
*B65G 17/08* (2006.01)
(52) U.S. Cl.
CPC ........ *B65G 17/083* (2013.01); *B65G 2207/12* (2013.01)
(58) Field of Classification Search
None
See application file for complete search history.

(56) References Cited

U.S. PATENT DOCUMENTS

| 4,679,687 | A | | 7/1987 | Rehm | |
|---|---|---|---|---|---|
| 4,940,133 | A | * | 7/1990 | Roinestad | B65G 17/064 198/852 |
| 5,054,609 | A | * | 10/1991 | Poerink | B65G 17/063 198/852 |
| 5,141,102 | A | * | 8/1992 | Roinestad | B65G 17/064 198/852 |

(Continued)

FOREIGN PATENT DOCUMENTS

| EP | 0377775 A1 | 7/1990 |
|---|---|---|
| EP | 2238055 B1 | 8/2012 |

(Continued)

*Primary Examiner* — Kavel Singh
(74) *Attorney, Agent, or Firm* — The Webb Law Firm

(57) ABSTRACT

Provided is a conveyor belt including at least two parallel chains each including a plurality of consecutive links; and a plurality of rods extending between the at least two parallel chains for linking the consecutive links. Each rod extends with each end through the corresponding chain linking two consecutive links to each other. One of the two consecutive links is at least axially locked to the rod to avoid movement of the link relative to the rod. The other of the two consecutive links is rotatably arranged around the respective rod. Also provided is at least one device for providing the lock between a rod and a respective link of the conveyor belt. The device includes a body; an insertion hole in which an end of the rod is inserted along an insertion axis, which insertion hole is arranged in the body and a protrusion arranged to the body and extending from the body parallel to and at a distance of the insertion axis; fixing means for fixing the end (Continued)

of the rod in the hole in at least axial direction and preferably also in rotational direction. The respective link is provided with a locking opening through which the protrusion extends.

12 Claims, 3 Drawing Sheets

(56) References Cited

U.S. PATENT DOCUMENTS

| | | | | |
|---|---|---|---|---|
| 5,190,143 | A * | 3/1993 | Froderberg | B65G 17/064 198/852 |
| 5,622,252 | A * | 4/1997 | Raum | B65G 17/063 198/852 |
| 5,906,270 | A * | 5/1999 | Faulkner | B65G 17/086 198/853 |
| 5,954,188 | A * | 9/1999 | Etherington | B65G 17/064 198/778 |
| 6,129,205 | A * | 10/2000 | Ergenbright | B65G 17/064 198/852 |
| 6,354,432 | B1 * | 3/2002 | Maine, Jr. | B65G 17/063 198/852 |
| 6,360,882 | B1 * | 3/2002 | Maine, Jr. | B65G 17/063 198/852 |
| 6,371,284 | B1 * | 4/2002 | Pasch | B65G 17/086 198/848 |
| 7,762,388 | B2 * | 7/2010 | Lago | B65G 17/063 198/848 |

FOREIGN PATENT DOCUMENTS

| | | |
|---|---|---|
| GB | 1311769 A | 3/1973 |
| IT | PD20130069 A1 | 9/2014 |

* cited by examiner

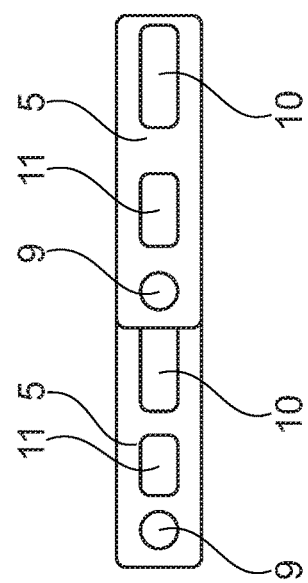
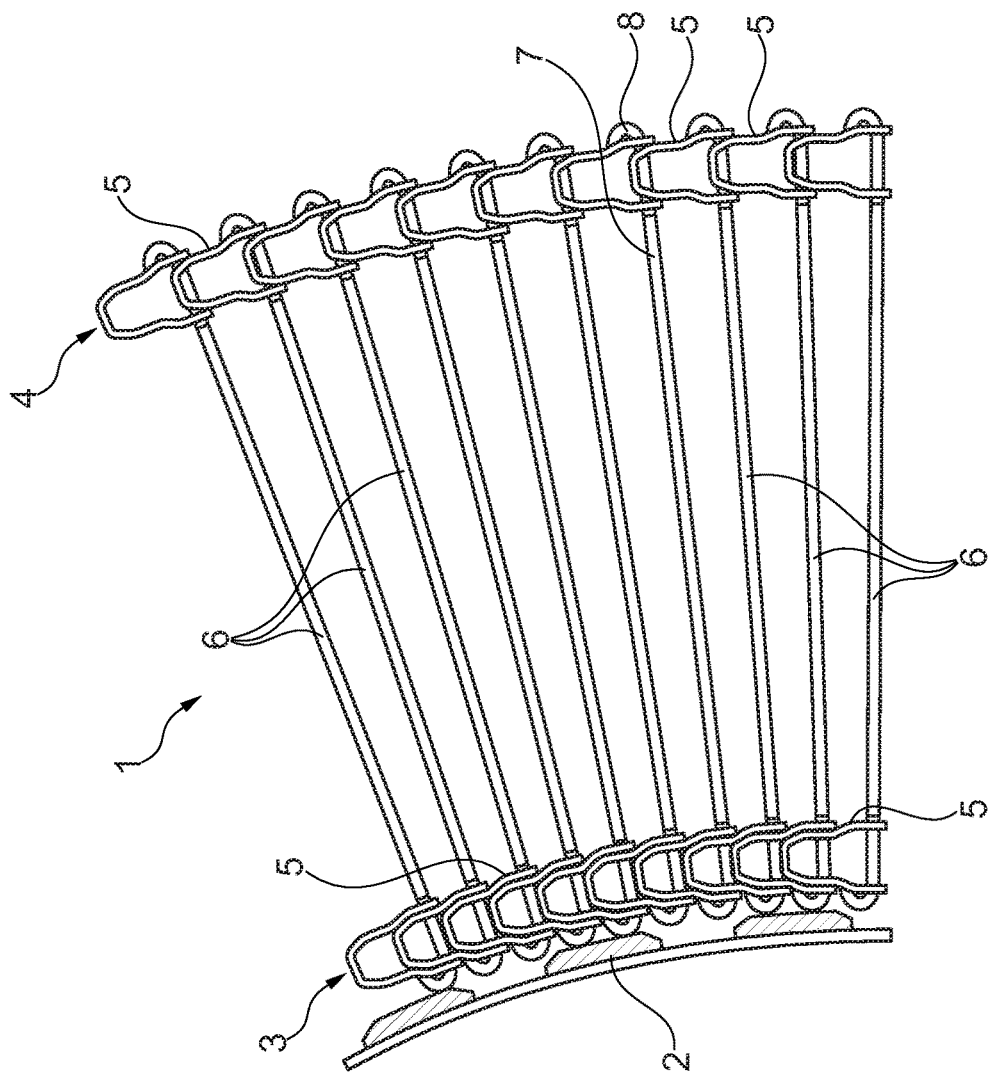

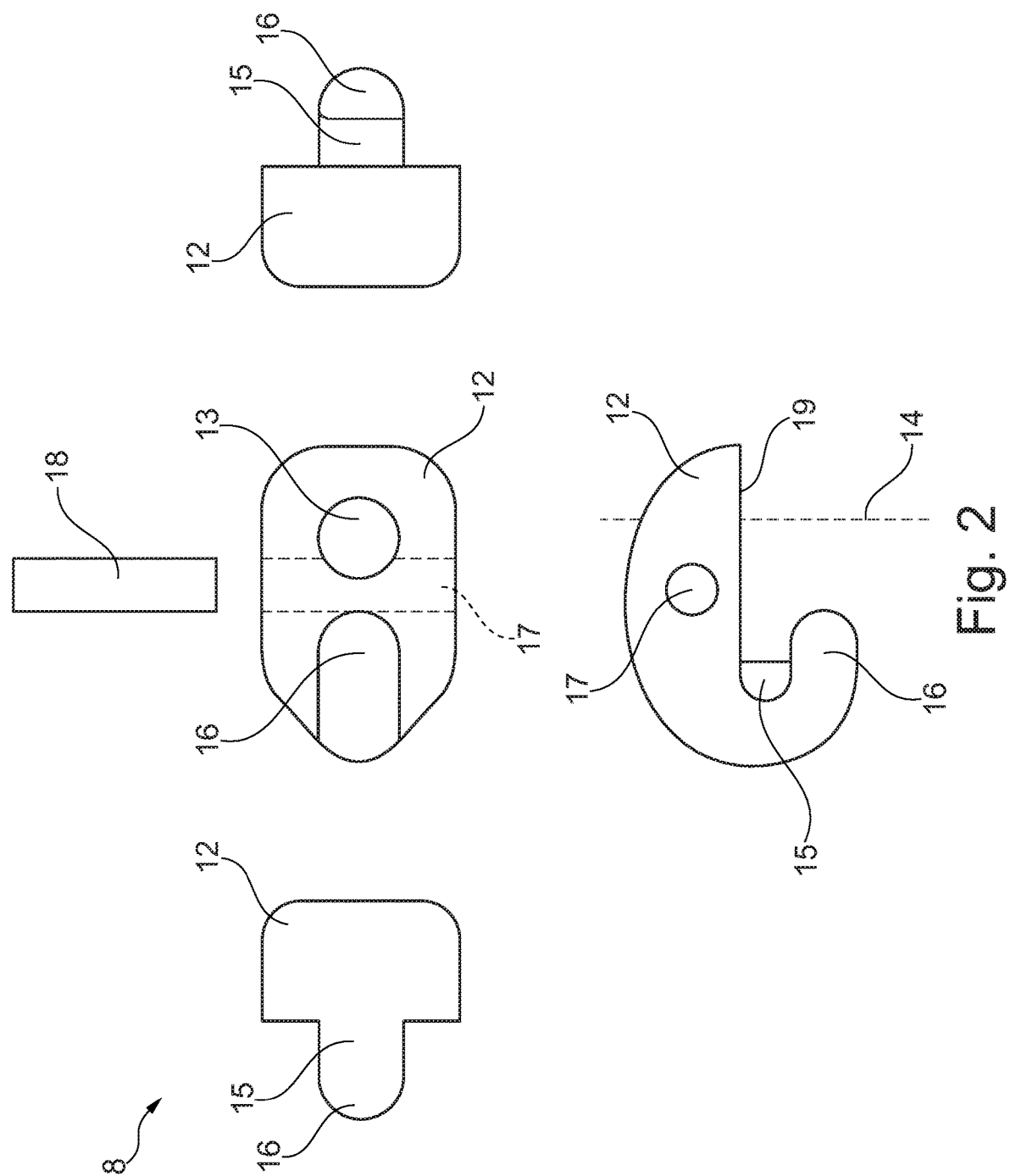

CONVEYOR BELT AND DEVICE FOR LOCKING A ROD TO A LINK OF SUCH A CONVEYOR BELT

CROSS-REFERENCE TO RELATED APPLICATION

This application claims priority to European Patent Application No. 22164838.9 filed Mar. 28, 2022, the disclosure of which is hereby incorporated by reference in its entirety.

BACKGROUND OF THE INVENTION

Field of the Invention

The invention relates to a conveyor belt comprising:
at least two parallel chains each comprising a plurality of consecutive links;
a plurality of rods extending between the at least two parallel chains for linking the consecutive links,
wherein each rod extends with each end through the corresponding chain linking two consecutive links to each other, wherein one of the two consecutive links is locked at least axially to the rod to avoid movement of the link relative to the rod and wherein the other of the two consecutive links is rotatably arranged around the respective rod.

Description of Related Art

Such a conveyor belt is known from EP 2238055. With this known conveyor belt, the rods are locked both axially and rotationally to a respective link by the end being bent back into a locking opening provided in the link, as well as a weld between the rod and the link. This ensures that the rod cannot move in axial direction relative to the weld, as well as rotate around the axis of the rod relative to the link.

Such a locking of the rods relative to the links is of importance to avoid so-called tenting, wherein the links have the tendency to rotate upwards from the conveyor belt supporting surface, such that one of the chains collapses. This tenting could occur especially in curves of the conveyor belt, but also when unequal loads are applied to the conveyor, for example when products are placed onto and removed from the conveyor belt.

It could happen that such a conveyor belt fails or that the conveyor belt needs to be removed for maintenance. Then a new rod has to be mounted in the conveyor belt. This typically involves some welding in order to ensure that the new rod is locked again to a link.

A qualified welder is not always available for a user of a conveyor belt, such that some time will pass before a welder is present to weld the rod to the respective link. This results in costly downtime of the conveyor belt and it is a desire to reduce the downtime as much as possible.

Furthermore, such known conveyor belts are often provided with plastic deck elements arranged between the two metal chains and on top of the metal rods. When welding the rod to a link, there is a substantial heat involved, which could ignite the plastic deck elements. This poses a substantial risk for the factory in which the conveyor belt is used.

SUMMARY OF THE INVENTION

Accordingly it is an object of the invention to reduce or even remove the above mentioned disadvantages.

This object is achieved according to the invention with a conveyor belt according to the preamble, which is characterized by at least one device for providing the lock between a rod and a respective link of the conveyor belt, which device comprises:
a body;
an insertion hole in which an end of the rod is inserted along an insertion axis, which insertion hole is arranged in the body;
a protrusion arranged to the body and extending from the body parallel to and at a distance of the insertion axis;
fixing means for fixing the end of the rod in the hole in at least axial direction and preferably also in rotational direction,
wherein the respective link is provided with a locking opening through which the protrusion extends.

With the device for providing the lock it is possible to lock a rod at least axially to a link without any welding. The end of the rod is fixed to the body such that the rod cannot shift and preferably also not rotate relative to the body. The protrusion arranged to the body and extending through the locking opening in the link ensures that the body cannot rotate relative to the link and preferably ensure that the rod is locked to the respective link and no rotation is possible between the rod and the link.

The use of a body also allows for shaping the locking device to a shape, which corresponds with the conventional locking methods. In case of a conveyor belt according to EP 2238055, in which the locking is provided by bending the end of a rod back into the locking opening, this curve of the end of the rod can easily be provided in the body of the locking device.

In a preferred embodiment of the conveyor belt according to the invention a nose part is arranged to the free end of the protrusion, which nose part extends perpendicular to the insertion axis and at a distance from the surface of the body and on the opposite side of the respective link.

The nose part provides a hook shape to the protrusion, such that the locking device can be hooked onto the locking opening in the link and axial displacement of the body relative to the link is prevented. When the rod is fixed into the insertion hole, the nose part also ensures that the rod can no longer be displaced in axial direction relative to the link.

In a further embodiment of the conveyor belt according to the invention the body comprises a flat contact surface for direct contact with the respective link, wherein both the hole and the protrusion are extending perpendicular from this flat contact surface.

The flat contact surface reduces any gaps between the link and the locking device and ensures that the forces between the rod and the protrusion extending through the link are transferred efficiently.

In yet another embodiment of the conveyor belt according to the invention each link has a first hole on one end of the link and a second hole on the opposite end of the link, wherein rods extend both through the first hole and the second hole and wherein the rod extending through the first hole is at least axially locked to the link and wherein the rod extending through the second hole is rotatable in said second hole.

The links could be flat links or could be U-shaped, such as used in EP 2238055, which allow for the conveyor belt to curve in the plane of the supporting surface of the conveyor belt.

The locking opening is typically provided between the first hole and the second hole.

Preferably, the locking opening and the second hole are fused together. Especially with links allowing for curvature of the conveyor belt, the second hole is typically slot shaped such that the rod can shift within said slot shaped opening. The protrusion can easily extend into this slot shaped opening to lock the rotation of the rod relative to the link.

In yet a further preferred embodiment of the conveyor belt according to the invention the fixing means comprise:
- a fixing hole arranged in the body and extending perpendicular to the insertion axis, wherein the fixing hole partially intersects with the insertion hole;
- a pin extending through the fixing hole and intersecting the insertion hole;
- wherein the end of the rod is provided with a recessed surface zone, which is aligned with the fixing hole and wherein the pin is in direct contact with the recessed surface zone to prevent rotation of the rod relative to the body.

Preferably, the recessed surface zone is a flattened surface zone or a peripheral groove. A flattened surface zone will provide also rotational locking of the body relative to the rod, while a peripheral groove will provide only axial locking of the body relative to the rod.

In a further embodiment of the conveyor belt according to the invention the lock between a rod and a respective link of the conveyor belt is provided by a rod end extending through the respective link and being bent back into a locking opening provided in the respective link.

The locking device of the invention is typically used on one or a few of the rods of a conveyor belt, while the majority of the rods are provided with a lock according to the prior art, such as a rod end being bent back into a locking opening. The locking device according to the invention is then used only when a rod needs to be replaced or to provide a specific position where the conveyor belt can be disassembled and reassembled without the need of any cutting and welding.

The invention also relates to a device for providing the lock between a rod and a respective link of a conveyor belt according to any of the preceding claims, which device comprises:
- a body;
- an insertion hole in which an end of a rod can be inserted along an insertion axis, which insertion hole is arranged in the body;
- a protrusion arranged to the body and extending from the body parallel to and at a distance of the insertion axis;
- fixing means for fixing the end of the rod in the hole.

In a preferred embodiment of the device according to the invention the fixing means comprise:
- a fixing hole arranged in the body and extending perpendicular to the insertion axis, wherein the fixing hole partially intersects with the insertion hole;
- a pin extending through the fixing hole and intersecting the insertion hole in at least axial direction and preferably also in rotational direction.

BRIEF DESCRIPTION OF THE DRAWINGS

These and other features of the invention will be elucidated in conjunction with the accompanying drawings.

FIG. 1A shows a top view of an embodiment of a conveyor belt according to the invention.

FIG. 1B shows a side view of two consecutive links of the conveyor belt of FIG. 1A.

FIG. 2 shows different side views of a locking device for the conveyor belt according to FIG. 1A.

DESCRIPTION OF THE INVENTION

Figure 3B:
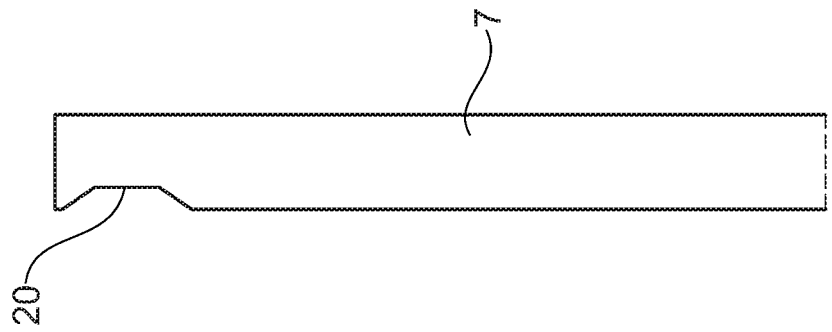
FIG. 3B shows the rod of FIG. 3A.

FIG. 1A shows a conveyor belt 1 according to the invention. The conveyor belt 1 curves around a driven drum 2. The conveyor belt 1 has two parallel chains 3, 4 of links 5.

A plurality of rods 6 extend between the two chains 3, 4 of links. Each rod 6 extends with an end through two consecutive links 5 and the end is bend back into the link 5 to fix the rod to the links 5. One rod 7 of the conveyor belt 1 is however provided with a locking device 8 according to the invention.

FIG. 1B shows two consecutive links 5 from a side. Each link 5 has a first hole 9 and a second slot shaped hole 10, which allows the curvature of the conveyor belt 1 as shown in FIG. 1A. A locking opening 11 is positioned between each first hole 9 and second hole 10.

FIG. 2 shows different side views of the locking device 8. The device 8 has a body 12 with an insertion hole 13 with an insertion axis 14. The body 12 is furthermore provided with a protrusion 15 extending from the body 12 parallel to and at a distance of the insertion axis 14.

A nose part 16 is arranged to the free end of the protrusion, 15 and extends perpendicular to the insertion axis 14.

Furthermore, a fixing hole 17 is arranged in the body 12 and extends perpendicular to the insertion axis 14. The fixing hole 17 partially intersects with the insertion hole 13. A locking pin 18 can be inserted into the fixing hole 17 to lock a rod into the body 12.

Figure 3A:
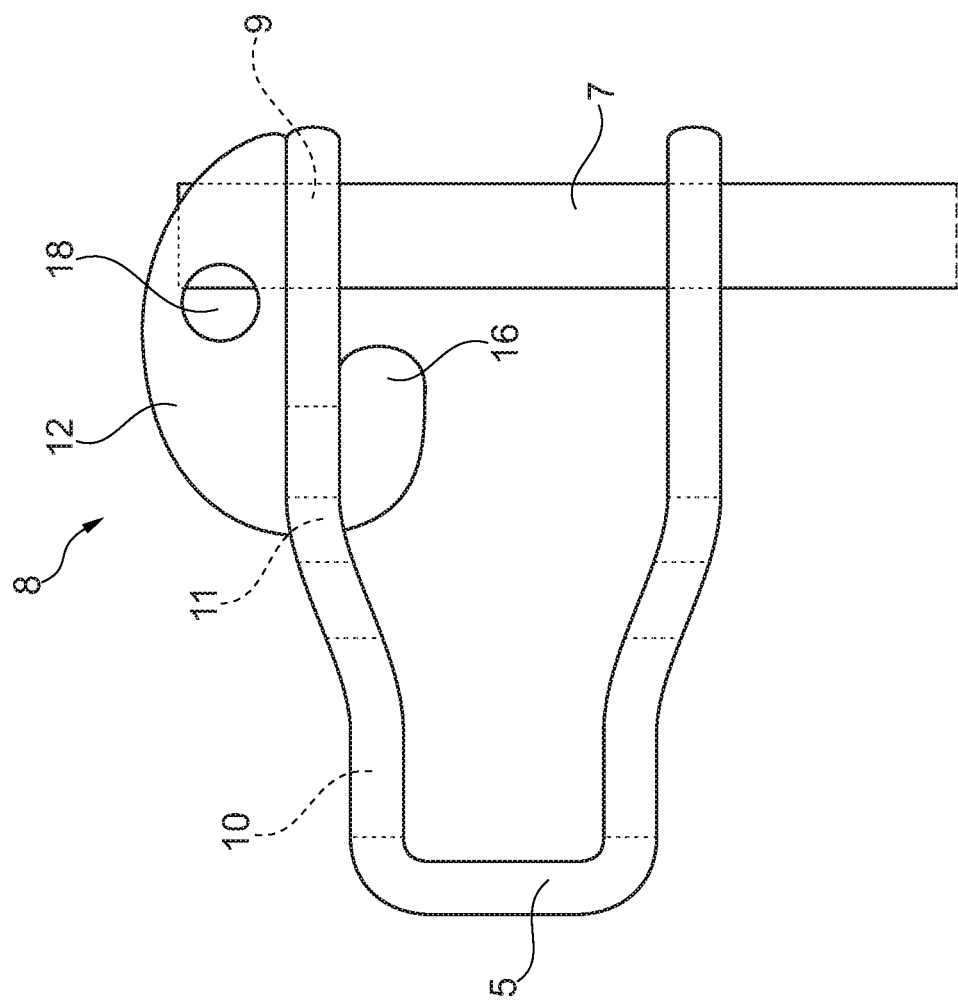
FIG. 3A shows a detailed top view of a rod, link and locking device of the conveyor belt according to FIG. 1A.

The body 12 is provided with a flat contact surface 19 for direct contact with a link 5, as shown in FIG. 3A.

FIG. 3A shows a detail of a link 5, a rod 7 and a locking device 8 according to the invention. The nose part 16 is moved through the locking opening 11 and hooks behind the link 5 opposite of the body 12 of the locking device 8. The rod 7 extends through the first holes 9 and into the insertion opening.

The end of the rod 7 has a flattened surface zone 20 (see FIG. 3B), such that the locking pin 18 can lock the end of the rod 7 into the body 12. Because the protrusion 15 extends in the insertion opening 11, the rod 7 is locked to the link 5 and relative rotation is prevented. Because the nose part 16 extend on the opposite side of the link 5, the rod 7 can also no longer shift in axial direction relative to the link 5. If a peripheral groove would be applied to the end of the rod 7, instead of a flattened surface zone, then rotation of the body 12 relative to the rod 7 would be possible, but still axial movement would be prevented.

The invention claimed is:
1. A conveyor belt comprising:
   at least two parallel chains each comprising a plurality of consecutive links; and
   a plurality of rods extending between the at least two parallel chains for linking the consecutive links,
   wherein each rod extends with each end through the corresponding chain linking two consecutive links to each other, wherein one of the two consecutive links is at least axially locked to the rod to avoid movement of the link relative to the rod and wherein the other of the two consecutive links is rotatably arranged around the respective rod, at least one device for providing the lock between a rod of the plurality of rods and a respective link of the conveyor belt, the at least one device comprising:
  a body;
  an insertion hole in which an end of the rod is inserted along an insertion axis, which insertion hole is arranged in the body;
  a protrusion arranged relative to the body and extending from the body parallel to and at a distance from the insertion axis; and
  fixing means for fixing the end of the rod in the hole in at least an axial direction,
wherein the respective link is provided with a locking opening through which the protrusion extends, and
wherein the fixing means comprises:
  a fixing hole arranged in the body and extending perpendicular to the insertion axis such that the fixing hole partially intersects with the insertion hole; and
  a pin configured to extend through the fixing hole and at least partially intersecting the insertion hole.

2. The conveyor belt according to claim 1, wherein a nose part is arranged at the free end of the protrusion, which nose part extends perpendicular to the insertion axis and at a distance from the surface of the body and on the opposite side of the respective link.

3. The conveyor belt according to claim 1, wherein the body comprises a flat contact surface for direct contact with the respective link, and wherein both the hole and the protrusion are extending perpendicular from the flat contact surface.

4. The conveyor belt according to claim 1, wherein each link has a first hole on one end of the link and a second hole on the opposite end of the link, wherein rods extend both through the first hole and the second hole and wherein the rod extending through the first hole is at least axially locked to the link and wherein the rod extending through the second hole is rotatable in said second hole.

5. The conveyor belt according to claim 4, wherein the locking opening is provided between the first hole and the second hole.

6. The conveyor belt according to claim 5, wherein the locking opening and the second hole are fused together.

7. The conveyor belt according to claim 1, wherein the end of the rod is provided with a recessed surface zone, which is aligned with the fixing hole and wherein the pin is in direct contact with the recessed surface zone to prevent at least axial displacement of the rod relative to the body.

8. The conveyor belt according to claim 7, wherein the recessed surface zone is a flattened surface zone or a peripheral groove.

9. The conveyor belt according to claim 1, wherein the lock between a rod and a respective link of the conveyor belt is provided by a rod end extending through the respective link and being bent back into a locking opening provided in the respective link.

10. A device for providing the lock between a rod and a respective link of a conveyor belt according to claim 1, which device comprises:
  a body;
  an insertion hole in which an end of a rod can be inserted along an insertion axis, which insertion hole is arranged in the body;
  a protrusion arranged relative to the body and extending from the body parallel to and at a distance of the insertion axis; and
  fixing means for fixing the end of the rod in the hole in at least axial direction and preferably also in rotational direction.

11. The device according to claim 10, wherein the fixing means comprise:
  a fixing hole arranged in the body and extending perpendicular to the insertion axis, wherein the fixing hole partially intersects with the insertion hole; and
  a pin extending through the fixing hole and intersecting the insertion hole.

12. The device according to claim 1, wherein the fixing means fixes the end of the rod in a rotational direction.

* * * * *